(12) United States Patent
Guo et al.

(10) Patent No.: US 9,407,920 B2
(45) Date of Patent: *Aug. 2, 2016

(54) VIDEO PROCESSOR WITH REDUCED MEMORY BANDWIDTH AND METHODS FOR USE THEREWITH

(71) Applicant: ViXS Systems, Inc., Toronto (CA)

(72) Inventors: Xin Guo, Toronto (CA); Qi Yang, North York (CA); Edward Hong, North York (CA); Wendy Wai Yin Cheung, Toronto (CA); Eric Young, Markham (CA); Chun-Chin Yeh, Markham (CA)

(73) Assignee: ViXS Systems, Inc., Toronto (CA)

( * ) Notice: Subject to any disclaimer, the term of this patent is extended or adjusted under 35 U.S.C. 154(b) by 278 days.

This patent is subject to a terminal disclaimer.

(21) Appl. No.: 14/133,775

(22) Filed: Dec. 19, 2013

(65) Prior Publication Data

US 2014/0205017 A1 Jul. 24, 2014

Related U.S. Application Data

(63) Continuation-in-part of application No. 13/933,281, filed on Jul. 2, 2013.

(60) Provisional application No. 61/755,280, filed on Jan. 22, 2013.

(51) Int. Cl.
*G09G 5/36* (2006.01)
*H04N 19/15* (2014.01)
*H04N 19/433* (2014.01)
(Continued)

(52) U.S. Cl.
CPC ............. *H04N 19/15* (2014.11); *G09G 5/363* (2013.01); *H04N 19/40* (2014.11); *H04N 19/426* (2014.11); *H04N 19/433* (2014.11); *G09G 2360/127* (2013.01); *G09G 2360/128* (2013.01); *H04N 19/167* (2014.11); *H04N 19/17* (2014.11); *H04N 19/174* (2014.11)

(58) Field of Classification Search
CPC ... G09G 5/393; G09G 5/39; G09G 2340/125; G09G 5/14; G09G 5/36
USPC ......................................................... 345/547
See application file for complete search history.

(56) References Cited

U.S. PATENT DOCUMENTS

| | | | | |
|---|---|---|---|---|
| 5,845,083 A | * | 12/1998 | Hamadani | H04N 19/61 348/403.1 |
| 8,493,396 B2 | * | 7/2013 | Karandikar et al. | 345/544 |
| 2007/0047659 A1 | * | 3/2007 | Aleksic | H04N 19/40 375/240.25 |
| 2007/0097130 A1 | * | 5/2007 | Margulis | 345/501 |

(Continued)

*Primary Examiner* — Ke Xiao
*Assistant Examiner* — Gordon Liu
(74) *Attorney, Agent, or Firm* — Garlick & Markison; Bruce E. Stuckman

(57) ABSTRACT

A video processing device includes a video processing unit that decodes a video input signal into a decoded video signal in accordance with a video compression protocol, based on uncompressed video frame data. A tile engine includes a tile accumulation module that accumulates the uncompressed video frame data into a plurality of tile units, wherein each of the plurality of tile units includes a plurality of video span units. A tile compression/decompression module generates compressed video frame data for storage in a compressed video frame buffer by compressing the plurality of video span units into a plurality of compressed video span units and further that retrieves the compressed video frame data from the compressed video frame buffer by retrieving the plurality of compressed video span units and generating the uncompressed video frame data by decompressing the plurality of compressed video span units.

18 Claims, 20 Drawing Sheets

(51) Int. Cl.
*H04N 19/40* (2014.01)
*H04N 19/426* (2014.01)
*H04N 19/174* (2014.01)
*H04N 19/17* (2014.01)
*H04N 19/167* (2014.01)

(56) References Cited

U.S. PATENT DOCUMENTS

2011/0154426 A1* 6/2011 Doser et al. .................... 725/118
2014/0092969 A1* 4/2014 Lee et al. .................. 375/240.15

* cited by examiner

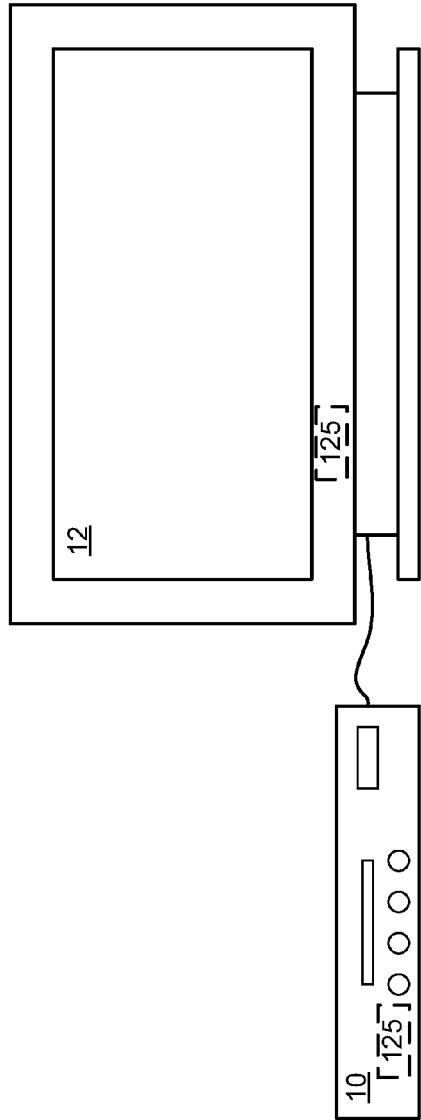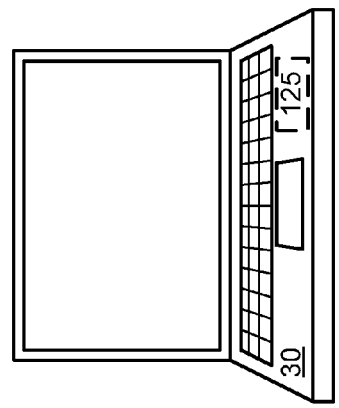

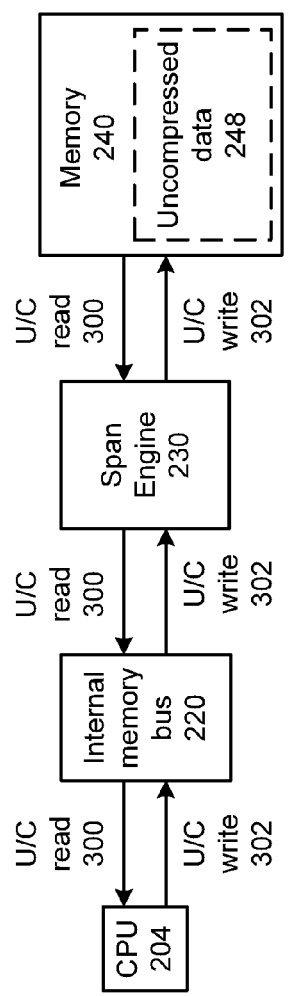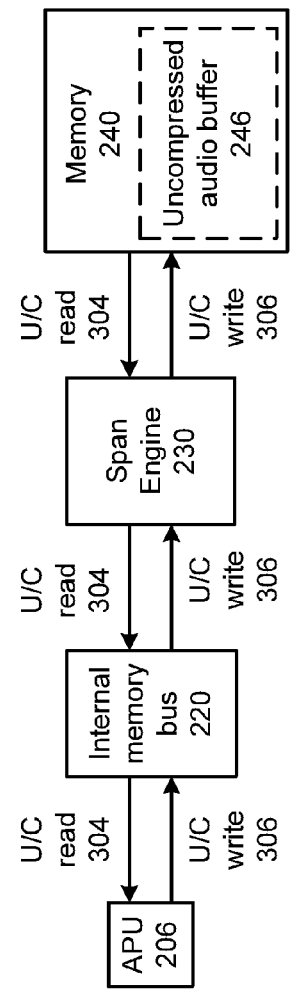
FIG. 9
FIG. 10

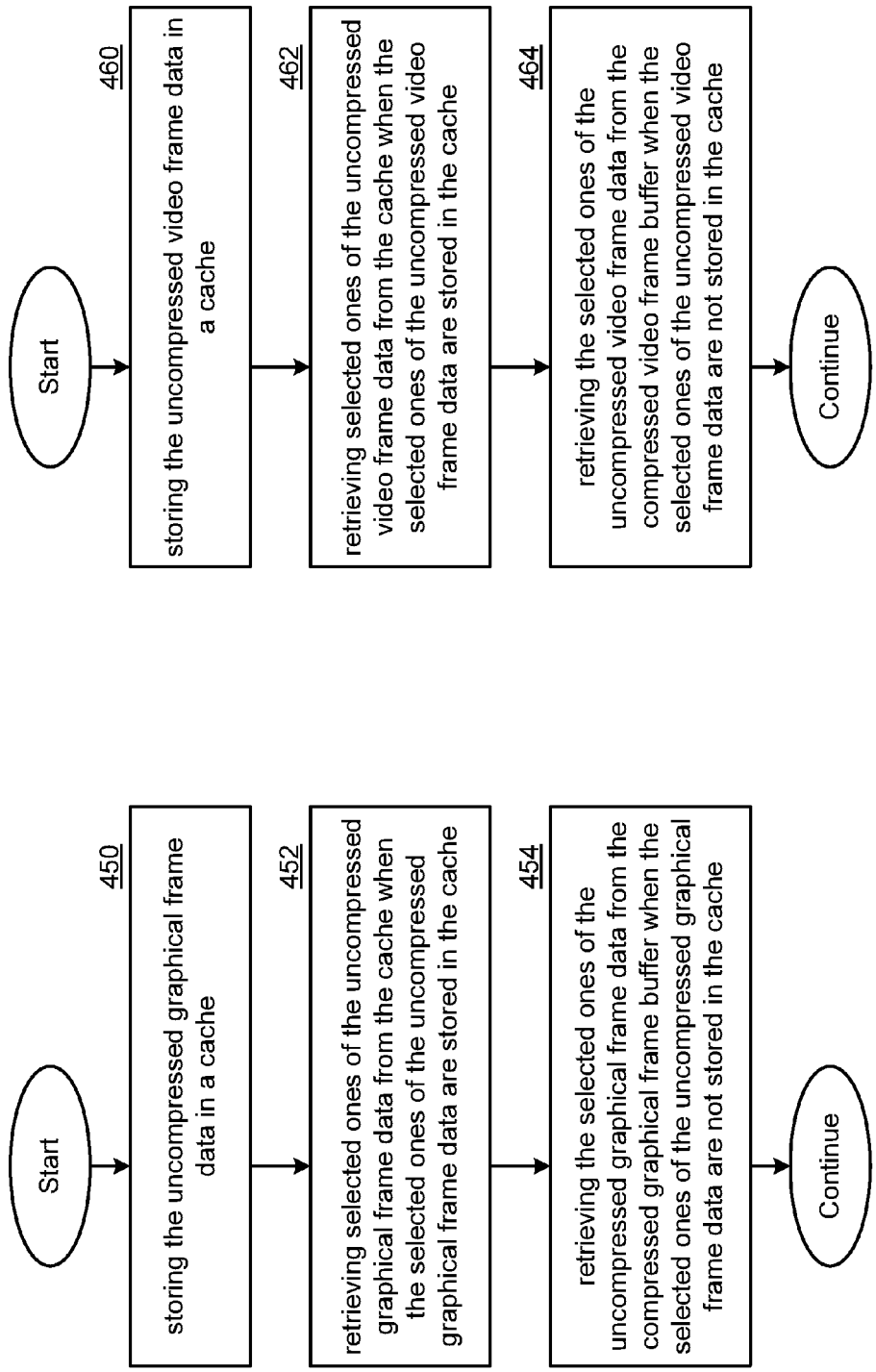

VIDEO PROCESSOR WITH REDUCED MEMORY BANDWIDTH AND METHODS FOR USE THEREWITH

CROSS REFERENCES TO RELATED APPLICATIONS

The present U.S. Utility patent application claims priority pursuant to 35 U.S.C. §120, as a continuation-in-part (CIP), to U.S. Utility application Ser. No. 13/933,281, entitled "VIDEO PROCESSOR WITH FRAME BUFFER COMPRESSION AND METHODS FOR USE THEREWITH", filed Jul. 2, 2013.

U.S. Utility application Ser. No. 13/933,281 claims priority pursuant to 35 U.S.C. §119(e) to U.S. Provisional Application No. 61/755,280, entitled "VIDEO PROCESSOR WITH FRAME BUFFER COMPRESSION AND METHODS FOR USE THEREWITH", filed Jan. 22, 2013.

All of which are hereby incorporated herein by reference in its entirety and made part of the present U.S. Utility patent application for all purposes.

TECHNICAL FIELD OF THE INVENTION

The present invention relates to encoding used in devices such as video encoders, decoders and transcoders.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods.

In modern devices that process video such as video processing integrated circuits, there are many instances where video or graphical data has to be stored in a memory that is external to the device. This is often done when the video or graphic frame is too big to be stored in memory within the device itself. As pixel resolution of the video or graphical frames increase, the memory bandwidth required by the processing of these video frames also increases. Memory bandwidth can be a consideration in designing such video devices.

Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIGS. 1-3 present pictorial diagram representations of a various video processing devices in accordance with embodiments of the present invention.

FIGS. 9-14 present block diagram representations of example read and write operations in accordance with embodiments of the present invention.

FIG. 27 presents a flowchart representation of a method in accordance with an embodiment of the present invention.

FIG. 28 presents a flowchart representation of a method in accordance with an embodiment of the present invention.

DETAILED DESCRIPTION OF THE INVENTION INCLUDING THE PRESENTLY PREFERRED EMBODIMENTS

FIGS. 1-3 present pictorial diagram representations of a various video processing devices in accordance with embodiments of the present invention. In particular, set top box 10 with built-in digital video recorder functionality or a stand alone digital video recorder, television computer 20 and portable computer 30 illustrate electronic devices that incorporate a video processing device 125 that includes one or more features or functions of the present invention. While these particular devices are illustrated, video processing device 125 includes any device that is capable of encoding and/or decoding video content in accordance with the methods and systems described in conjunction with FIGS. 4-33 and the appended claims.

Figure 4:
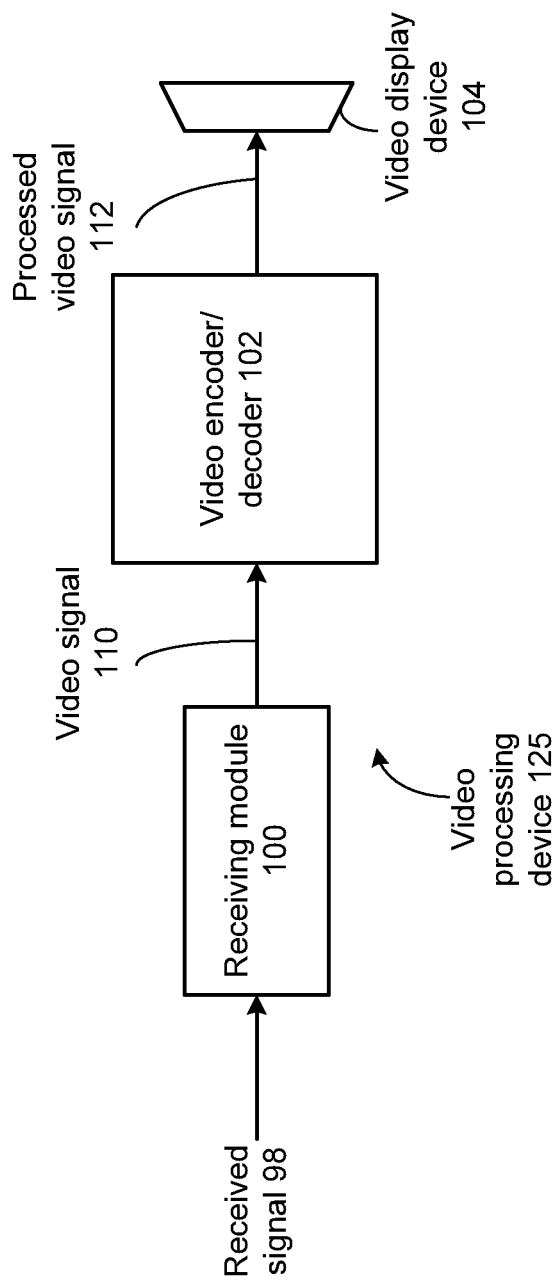
FIG. 4 presents a block diagram representation of a video processing device 125 in accordance with an embodiment of the present invention.

FIG. 4 presents a block diagram representation of a video processing device 125 in accordance with an embodiment of the present invention. In particular, video processing device 125 includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video encoding/decoding module 102 is coupled to the receiving module 100 to encode, decode or transcode the video signal in a format corresponding to video display device 104.

In an embodiment of the present invention, the received signal 98 is a broadcast video signal, such as a high definition televisions signal, enhanced high definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal or video download signal that is transmitted over a public or private network such as a local area network, wide area network, metropolitan area network or the Internet.

Video signal 110 and processed video signal 112 can be digital video signals that are formatted in accordance with a codec standard such as H.264, MPEG-4 Part 10 Advanced Video Coding (AVC) VC1 or other digital format such as a Motion Picture Experts Group (MPEG) format (such as MPEG1, MPEG2 or MPEG4), Quicktime format, Real Media format, or Windows Media Video (WMV) or another digital video format, either standard or proprietary. In particular, the video signal 110, once decoded, is sometimes used by the display, sometimes also blended with one or more graphical planes and then output to a TV; or the video can processed, scaled, blended with metadata, subtitles, close caption or graphical objects or menus and/or recompressed onto a compressed format so that it can be retransmitted to a remote device.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file.

Video encoder/decoder 102 operates in accordance with the present invention and, in particular, includes many optional functions and features described in conjunction with FIGS. 5-33 that follow.

Figure 5:
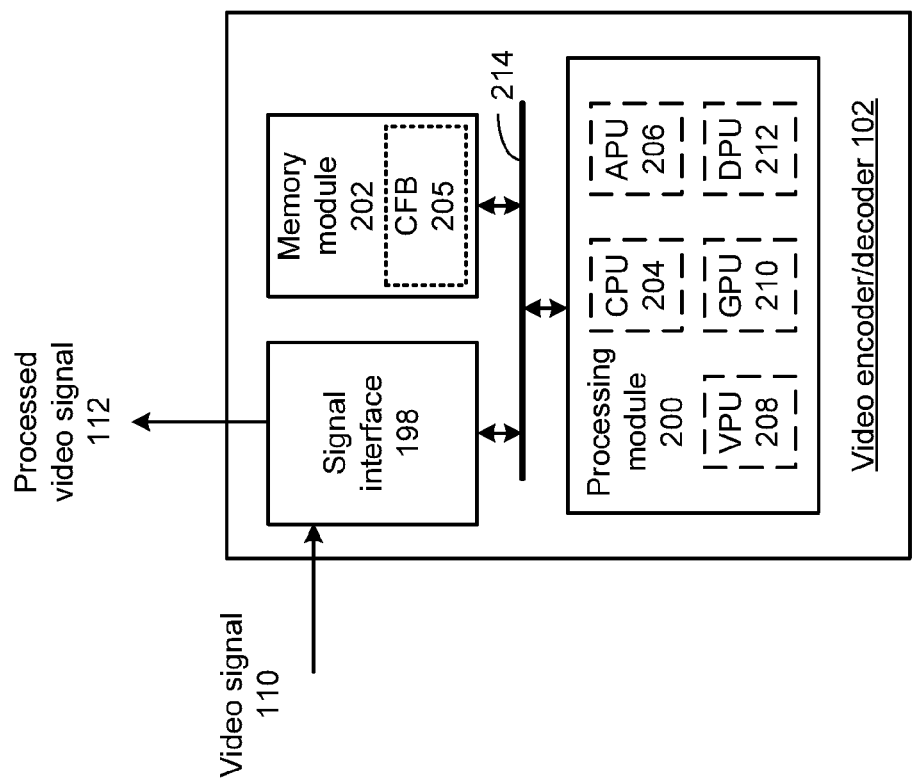
FIG. 5 presents a block diagram representation of a video encoder/decoder 102 in accordance with an embodiment of the present invention.

FIG. 5 presents a block diagram representation of a video encoder/decoder 102 in accordance with an embodiment of the present invention. In particular, video encoder/decoder 102 operates in accordance with many of the functions and features of the H.264 or H.265 standard, the MPEG-4 standard, VC-1 (SMPTE standard 421M) high definition media interface (HDMI) or other standard, to encode, decode or transcode a video input signal 110 into processed video signal 112. The video signal 110 is received and video signal 112 is output via a signal interface 198. The signal interface 198 includes one or more device interfaces that interface the video encoder/decoder 102 with other components of a host device and/or with other external devices such as a modem, network interface, wireless transceiver, data bus or other digital interface capable of receiving and/or outputting the video signal 110 and processed video signal 112.

The video encoder 102 includes a processing module 200 that includes one or more processing devices such as a central processing unit (CPU) 204, audio processing unit (APU) 206, video processing unit (VPU) 208, graphics processing unit (GPU) 210 and display processing unit (DPU) 212. Each of these processing units can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200, and memory module 202 are coupled, via bus 214, to the signal interface 198 and optionally to other modules not specifically shown that can be implemented in hardware, software or firmware. While a particular bus architecture is shown, alternative architectures using direct connectivity between one or more modules and/or additional busses can likewise be implemented in accordance with the present invention.

In operation, the processing module 200 operates to encode, decode or transcode the video signal 110 to generate processed video signal 112. This encoding, decoding and/or transcoding operates via one or more compressed frame buffers 205 that are stored in memory module 202. In particular, the memory module 202 provides an architecture to compress data required for video and/or graphical frame buffers that are stored in memory in order to reduce memory bandwidth.

In an embodiment, the video signal 110 is an enhanced bit-depth signal—in particular, a video signal that incorporates pixel bit depth beyond 8-bit. As pixel depth increases to 10-bit, 12-bit, or 16-bit, uncompressed memory bandwidth will increase by 25%, 50% or 100% correspondingly. One way to save on memory bandwidth is to use frame buffer compression because reference pixels usually exhibit strong spatial correlation. In particular, frame buffer compression can cut memory bandwidth increase by half on average with the memory bandwidth increase caused by increases in bit depth will be small comparing to no compression.

Two types of memory objects can be used during encoding, decoding and/or transcoding. One type of memory object is a "span unit" that can be characterized as a sequential data object. In sequential data objects, the processing is inherently linear and one dimensional and contiguous within a certain span. A second type of memory object is a "tile unit", that can be characterized as a data object such as a two dimensional matrix or other data structure that is subject to processing in a two dimensional way. In particular, a tile unit may have interdependencies or may include multiple span units that are created within the same operation.

Figure 6:
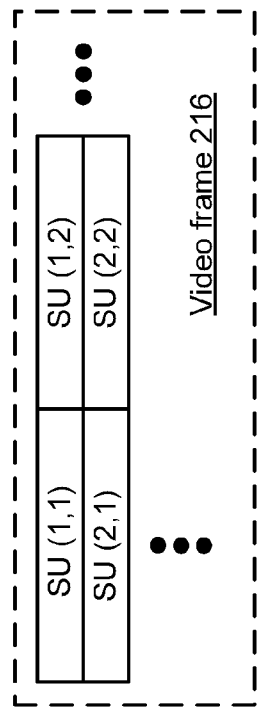
FIG. 6 presents a graphical representation of a video frame 216 in accordance with an embodiment of the present invention.

Example implementations of span units and tile units will be discussed in conjucntion with FIGS. 6-7 that follow FIG. 6 presents a graphical representation of a video frame 216 in accordance with an embodiment of the present invention. In particular, a video frame 216 is shown that includes a picture (frame or field) having a two dimensional array of pixels. The video frame 216 is segregated into a plurality of span units (SU) arranged as a two dimensional matrix or array. Each span unit includes at least a portion of a row of pixel data for the video frame 216. In the embodiment shown, the first row of pixel data of the video frame 216 is contained within SU(1,1), SU(1,2)..., and the second row of pixel data of the video frame 216 is contained within SU(2,1), SU(2,2)..., etc.). Each span unit is of a size predetermined during initialization of the encoder/decoder 102. In operation, the SUs are each compressed for storage in a compressed frame buffer. The length of a SU will be a size chosen to balance the needs to increase efficiency of the compression algorithm along with the need to minimize granularity loss to as small size as possible. Note there can be one or more types of SUs when, for example, multple compressed frame buffers 205 are implemented in conjunction with memory module 202. A SU for video stored in a video frame buffer could have a different length than that of a SU for graphics stored in a graphical frame buffer. Further, the underlying compression method could also be different for each different type of span unit. For example for a graphical SU and a video SU could be compressed differently for storage in their respective compressed frame buffers.

Figure 7:
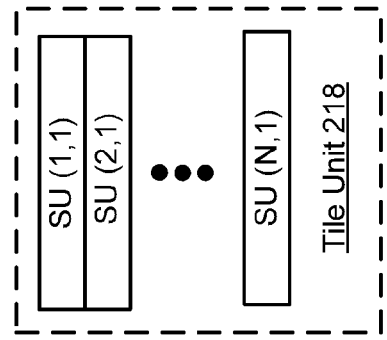
FIG. 7 presents a graphical representation that shows example tile unit 218 in accordance with an embodiment of the present invention.

FIG. 7 presents a graphical representation that shows example tile unit 218 in accordance with an embodiment of the present invention. In the example shown the tile unit (TU) 218 is composed of a series of SUs arranged vertically to form a two dimensional block. The dimensions of a TU is a size predetermined during initialization of the encoder/decoder 102. In the example shown, the TU has the same length as the SU however, other integer multiples of SU length could be implemented in other embodiments. Further, the height of the TU is shown as an integer, N, SUs. The height of the TU can be chosen to optimize the processing requirements of the underlying video processing.

Figure 8:
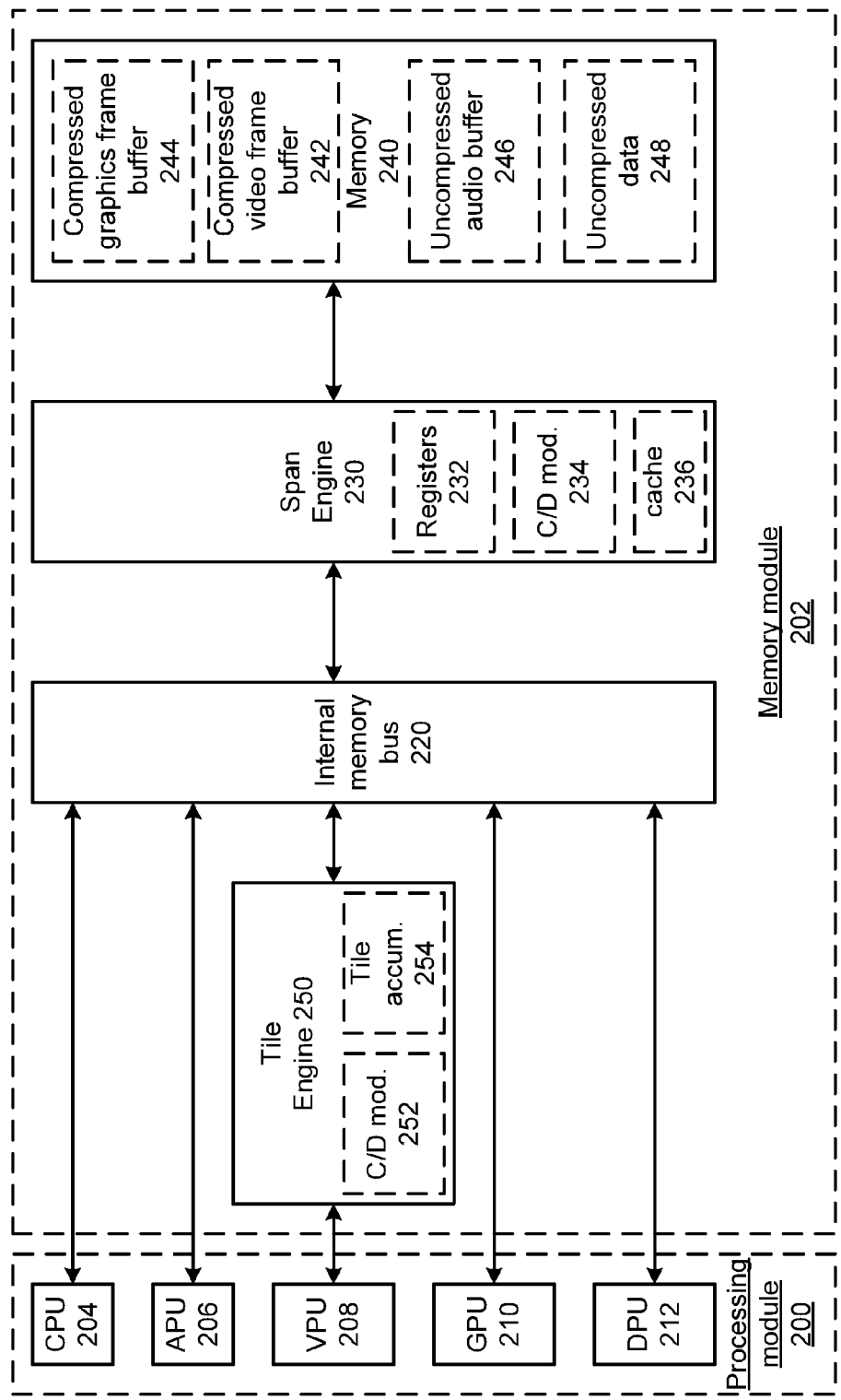
FIG. 8 presents a block diagram representation of a memory module 202 and processing module 200 in accordance with an embodiment of the present invention.

FIG. 8 presents a block diagram representation of a memory module 202 and processing module 200 in accordance with an embodiment of the present invention. In particular, the processing modules, CPU 204, APU 206, VPU 208, GPU 210 and DPU 212 are coupled to memory 240 via span engine 230 and an internal memory bus 220 that includes the read channel and write channel for memory 240. VPU 208 also is coupled via tile engine 250. While a single CPU 204, APU 206, VPU 208, GPU 210 and DPU 212 are presented, multiple processing units of each type can be implemented in a similar fashion.

The video processing unit 208 decodes a video input signal, such as video signal 110 into a processed video signal 112 in accordance with a video compression protocol. The VPU 208 operates based on uncompressed video frame data that is stored in a compressed format in compressed video frame buffer 242 of memory 240. The tile engine 250 includes a tile accumulation module 254 that accumulates the uncompressed video frame data into a plurality of tile units. A tile compression/decompression module 252 generates compressed video frame data for storage in the compressed video frame buffer 242 by compressing video span units of each tile unit into compressed video span units. The tile compression/decompression module 252 retrieves the compressed video frame data from the compressed video frame buffer 242 by retrieving the corresponding compressed video span units and generating the uncompressed video frame data by decompressing the compressed video span units.

The span engine 230 includes at least one register 232 that defines a range of memory addresses corresponding to the compressed video frame buffer and further a compressed graphics frame buffer 244. The graphics processing unit 210 processes one or more graphical planes of a video frame, based on uncompressed graphical frame data. The span engine further includes a span compression/decompression module 234 that generates compressed graphical frame data for storage in the compressed graphical frame buffer 244 by compressing the uncompressed graphical frame data into a plurality of compressed graphical span units and further that retrieves the compressed graphical frame data from the compressed graphical frame buffer by retrieving the corresponding compressed graphical span units and generating the uncompressed graphical frame data by decompressing the plurality of compressed graphical span units. The span engine 230 can perform a similar compression and decompression video span units—with the exception that read and write operations carried out by the VPU 208 through the tile engine 250 bypass the compression and decompression of the span engine 230. The span engine maintains a cache 236 that includes a set of cache buffers that cache span units, maintain coherency as well as service all reads and writes through the cache.

In operation, the each range register 232 defines a start address and a length in memory 240 of each of the compressed frame buffers. With the exception of bypass read operations where compression and decompression are handled via tile engine 250, any read operation with an address within a range register will first be checked against the cache 236. If span unit data is cached it can be serviced immediately. If the span unit data is not in cache 236, a compressed SU can be retrieved from memory 240 and decompressed before uncompressed span unit data will be returned. With the exception of bypass write operations, any write operation with an address within a range register will be accumulated within the cache buffer of cache 236 and maintained by the span engine. Bypass read and write operations can be ignored by the span engine 230 and sent directly to the memory 240.

In operation, the range register 232 defines a start address and a length in memory 240 of each of the compressed frame buffers. With the exception of bypass read operations where compression and decompression are handled via tile engine 250, any read operation with an address within a range register will first be checked against the cache 236. If span unit data is cached it can be serviced immediately. If the span unit data is not in cache 236, a compressed SU can be retrieved from memory 240 and decompressed before uncompressed span unit data will be returned. With the exception of bypass write operations, any write operation with an address within a range register will be accumulated within the cache buffer of cache 236 and maintained by the span engine. Bypass read and write operations can be ignored by the span engine 230 and sent directly to the memory 240.

The compressed video stream is decoded by a VPU 208. The decoded YUV data is written to the external memory.

This data will be accumulated within the tile accumulation module 254 of tile engine 250 as a cache where they are combined into spans of several SUs. Once a span is filled and compressed, a compressed TU can be written out directly to main memory as a series of compressed SU writes at the memory address reserved for the output of each compressed SU. If a TU is flushed when only partially filled, the missing data required to fill the entire TU can be gathered from compressed video frame buffer 242. Each compressed SU will be read in, decompressed by tile compression/decompression module 252 and combined within the other span units of the TU in order to create a full TU. Then the recombined TU can be compressed and written out as a series of compressed SU writes at the memory address reserved for the output of each compressed SU. If graphical planes are required, each graphical plane will be created by a GPU 210 that draws each element for storage in the compressed graphical frame buffer 244. The graphical frame buffer data is also broken into a series of compressed SU reads and writes. These reads and writes from and to memory 240 will be serviced by the span engine 230 via its cache 236 buffers. When a DPU 212 needs to composite each video and graphical plane for display, all reads will be decompressed via the span engine 230.

Further examples of read and write operations of memory module 202 will be presented in conjunction with FIGS. 9-14 that follow.

FIGS. 9-14 present block diagram representations of example read and write operations in accordance with embodiments of the present invention. As shown in FIG. 9 the CPU 204 generates read and write commands that operate on uncompressed data 248. The uncompressed write data 302 is coupled to the internal memory bus 220. Because the write address does not correspond to a compressed area of memory 240, the uncompressed write data 302 is passed directly to memory 240 to write addresses corresponding to the memory space of uncompressed data. Similarly, because the read address does not correspond to a compressed area of memory 240, the uncompressed read data 300 is passed directly from memory 240, thru the span engine 230 and to the internal memory bus 220 to be supplied to CPU 204.

As shown in FIG. 10, the APU 206 generates read and write commands that operate on uncompressed audio data 246. The uncompressed write data 306 is coupled to the internal memory bus 220. Because the write address does not correspond to a compressed area of memory 240, the uncompressed write data 306 is passed directly to memory 240 to write addresses corresponding to the memory space of uncompressed audio buffer 246 and uncompressed data space 248 can be passed directly to memory 240. Similarly, because the read address does not correspond to a compressed area of memory 240, the uncompressed read data 304 is passed directly from memory 240, thru the span engine 230 and to the internal memory bus 220 to be supplied to APU 206.

Figure 11:
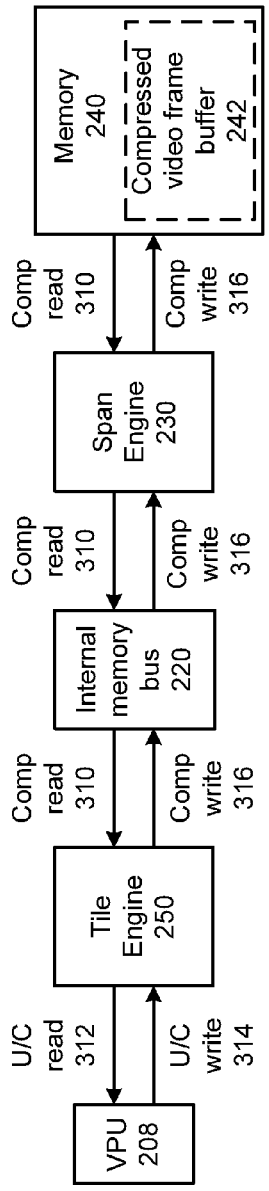

As shown in FIG. 11 the VPU 208 generates read and write commands that operate on compressed video frame data 242. The uncompressed write data 314 is acuumulated by tile engine 250 and output to the internal memory bus 220 as compressed write data 316 as a series of compressed span unit writes. The compressed write data 316 is a bypass operation that is passed directly to memory 240 in the memory space of compressed video frame data 242 reserved for these compressed span units. Similarly, the compressed read data 310 bypasses the span engine 230 and is passed directly from memory 240, thru the span engine 230 and to the internal memory bus 220. The tile engine 250 decompresses the compressed read data 310 to be supplied to VPU 208 as uncompressed read data 312.

Figure 12:
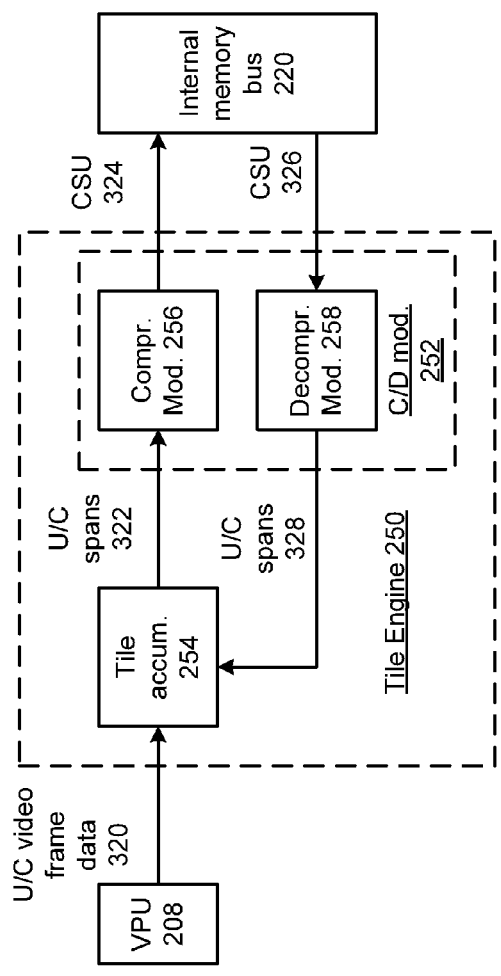

As shown in FIG. 12, uncompressed video frame data 320 in the form of, for example, decoded YUV data is accumulated within the tile accumulation module 254 of tile engine 250 as a cache where they are combined into uncompressed spans 322 of several SUs. Once a span is filled and compressed by compression module 256 into compressed span units 324, a compressed TU can be written out directly to memory via internal memory bus 220 as a series of compressed SU writes at the memory address reserved for the output of each compressed SU. If a TU is flushed when only partially filled, the missing data required to fill the entire TU can be gathered from the compressed video frame buffer. Each compressed SU 326 will be read in, decompressed by tile decompression module 258 and combined within the other span units of the TU in order to create a full TU. Then the recombined TU can be compressed and written out as a series of compressed SU writes at the memory address reserved for the output of each compressed SU.

Figure 13:
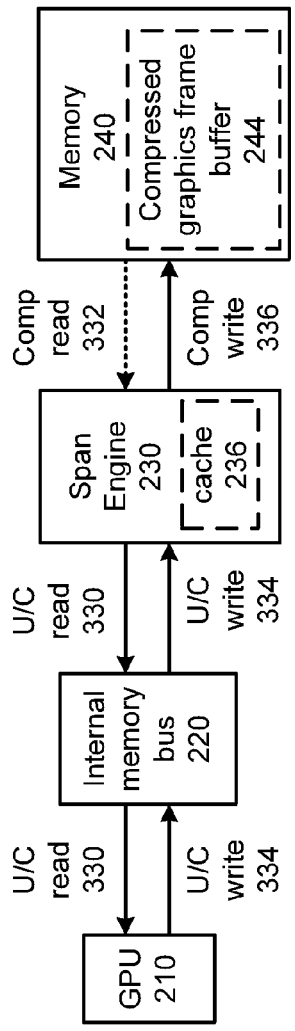

As shown in FIG. 13, the GPU 210 generates read and write commands that operate on compressed graphics frame buffer 244. The uncompressed write data 334 is coupled to the internal memory bus 220. Because the write address corresponds to a compressed area of memory 240, the uncompressed write data 334 is cached by span engine 230 and compressed to form compressed write data 336 before being stored in memory. Similarly, because the read address corresponds to a compressed area of memory 240, the uncompressed read data 330 is retrieved from cache 236 or generated by decompressing compressed read data 332 retrieved from memory 240, and supplied via the internal memory bus 220 to GPU 210 as uncompressed read data 330.

Figure 14:
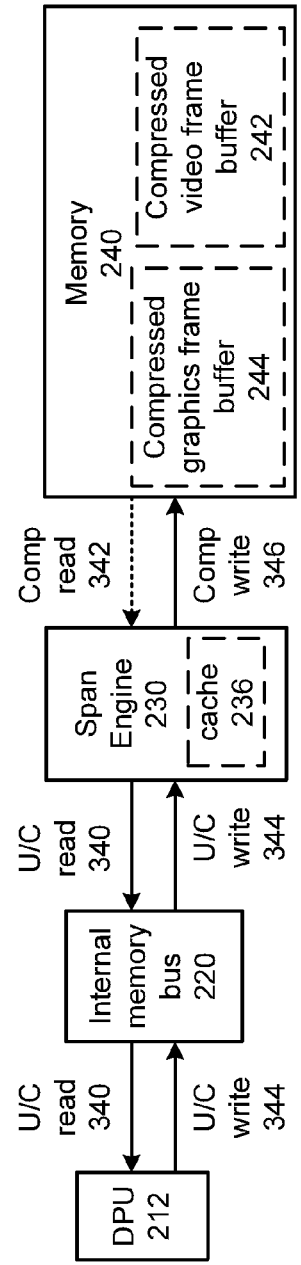

As shown in FIG. 14, the DPU 212 generates read and write commands that operate on compressed graphics frame buffer 244 and compressed video frame buffer 242. The uncompressed write data 344 is coupled to the internal memory bus 220. Because the write address corresponds to a compressed area of memory 240, the uncompressed write data 344 is cached by span engine 230 and compressed to form compressed write data 346 before being stored in memory. Similarly, because the read address corresponds to a compressed area of memory 240, the uncompressed read data 340 is retrieved from cache 236 or generated by decompressing compressed read data 342 retrieved from memory 240, and supplied via the internal memory bus 220 to VPU 204 as uncompressed read data 340.

Figure 15:
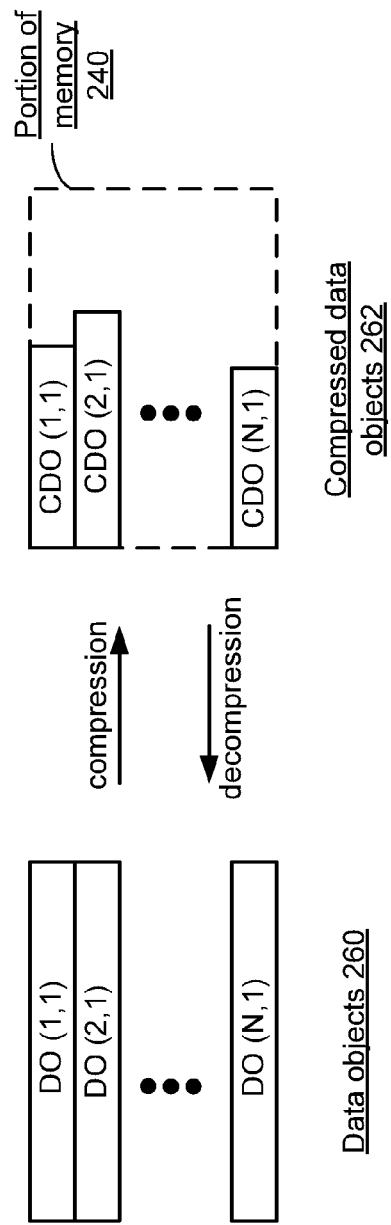
FIG. 15 presents a block diagram representation of a data object compression in accordance with an embodiment of the present invention.

FIG. 15 presents a block diagram representation of a data object compression in accordance with an embodiment of the present invention. In particular, an embodiment for data compression and decompression performed by compression decompression module 252 or 234 is presented. It is often not feasible to compress an entire video reference frame or graphical frame as a whole because later picture processing may only need a small part of that frame. As previously discussed, smaller data objects, such as span units are compressed into compressed data objects such as compressed span units in a fashion to offers random accessibility to portions of the frame data.

As shown, each data object (DO) 260 is then compressed individually into a corresponding compressed data object (CDO) 262. As shown, the compressed data objects 262 can be of different sizes based on the amount of compression for each data object 260. Each compressed data object 262 is stored in a predetermined location in a portion of memory 240, such as a range of addresses reserved for compressed data or compressed data of that type (video frame data, graphical frame data, etc.). In particular, each compressed data object 262 is stored at a base memory address at a corresponding predetermined location in memory. For example, the locations of data objects, such as span units, in a video frame or graphical frame can be predetermined, based on the size of the frame, resolution, etc. Each data object 260 can be associated with a base memory address in a portion of memory 240 corresponding to the location where the compressed data object 262 corresponding to that particular data object 260 will be stored.

Figure 16:
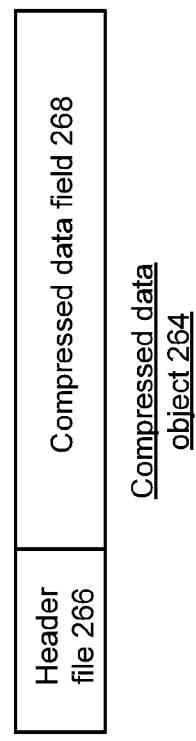
FIG. 16 presents a graphical representation of compressed data object 264 in accordance with an embodiment of the present invention.

FIG. 16 presents a graphical representation of compressed data object 264 in accordance with an embodiment of the present invention. As indicated in FIG. 15 the compressed data objects 262 can be of different sizes based on the amount of compression for each data object 260. In operation, the compression decompression module 252 or 234 compresses the data object, generates a header file 266 that indicates the size of the compressed data for each compressed data object 262 and stores the compressed data in compressed data field 268.

When a region of a frame is needed, the decompression module first identifies selected ones of compressed data objects 262 that correspond to the selected portion of frame. The compression decompression module 252 then calculates the location of the required data objects in memory by determining the corresponding base memory addresses of each compressed data object 262. The compression decompression module 252 fetches the correct size for each compressed data object 262 by reading the corresponding header file 266, retrieving the compressed data field 268 based on the size, and decompressing the compressed data field to regenerate the data object 260.

It should be noted that, while previously described in conjunction with the compression of span units, in other embodiments, the compression decompression module 252 can operate to directly compress tile units rather than individually compressing span units. Further different compression decompression module 252 or 234 can optionally employ different compression methodologies for different data objects corresponding to, for example, compressed video span units and compressed graphical span units.

In an embodiment of the present invention, frame data, such as video frame data, is compressed with a mixture of lossy and lossless compression in order to more flexibly achieve a particular rate of bandwidth reduction. It is understood that with lossy compression, the stored frames will be different from the original. When these frames are displayed or used as reference frames, there will be a mismatch. Degradation in image quality is traded for increased memory bandwidth efficiency.

In an embodiment, a compression goal can be set and lossless compression can be employed as long as the actual compression realized for a particular data object 260 meets or exceeds the compression goal. In circumstances where lossless compression is insufficient to meet or exceed the compression goal lossy compression can be employed to meet or exceed the compression goal. For example, the compression/decompression module 252 or 234 can operate to initially compress a data object 260 using a lossless scheme. If the compression goal is not reached, the data object 260 is quantized and compressed again. This process is repeated until the compression goal is achieved.

The process of compression and, in particular, the selection of lossless/lossy compression for each data object 260 can be described in conjunction with the following:

(a) compress the data object 260;
(b) compare an amount of compression of the data object 260 to a compression goal (c) store the compressed data object 262 in the compressed video frame buffer when the amount of compression of the data object 260 compares favorably to the compression goal;
(d) discard the compressed video data object 260 when the amount of compression of the data object compares unfavorably to the compression goal and quantize the data object 260; and
(e) repeat steps (a)-(d) until the amount of compression of the data object 260 compares favorably to the compression goal.

As described above, when lossless compression is insufficient to reach a compression goal, the data object 260 is repeatedly quantized until compression of the quantized data object meets or exceeds the compression goal. This can result in data frame compression where a first subset of the data objects 260 being compressed via lossless compression and a second subset of the data objects 260 are compressed via lossy compression—depending on the particular compression goal that was chosen and the amount of compression possible for each of the particular data objects 260 on the frame data to be compressed. It should be noted further that a video frame can be divided into regions and use this scheme to achieve different compression goals for different regions. For example, center portions of a screen can employ lessor compression goals to preserve fidelity compared with peripheral portions of a frame. In addition, regions of interest in a video frame can be identified corresponding to important images. The region or regions of interest in a video frame can employ lessor compression goals to preserve fidelity compared with portions of the frame outside of the region or regions of interest.

This use of differing compression goals based on an identified region or regions of a video frame including several options functions and features will be discussed further in conjunction with FIGS. 17-19 that follow.

Figure 17:
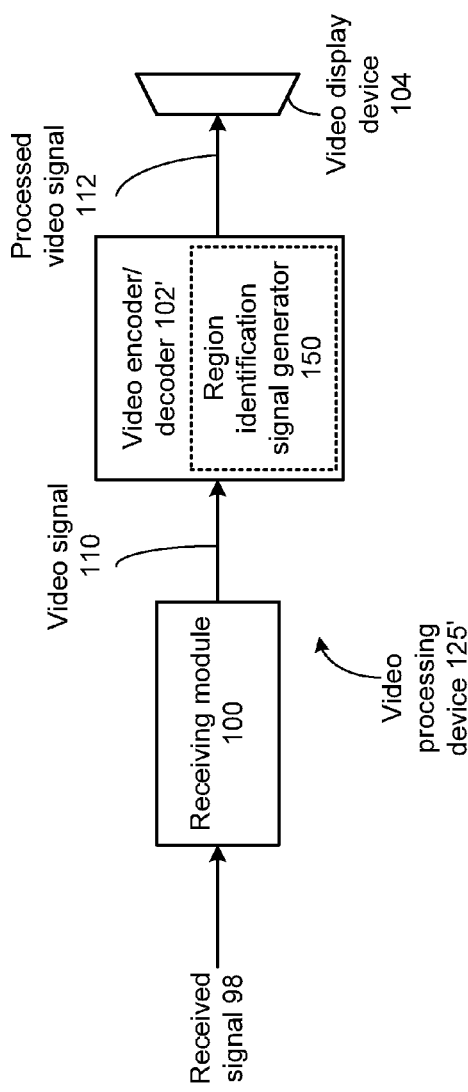
FIG. 17 presents a block diagram representation of a video processing device 125' in accordance with an embodiment of the present invention.

FIG. 17 presents a block diagram representation of a video processing device 125' in accordance with an embodiment of the present invention. In particular, a video processing device 125 is presented that functions similarly to video processing device 125, yet the video encoder/decoder 102' includes a regions identification signal generator 150 for identifying a regions or regions of interest in a video frame. The compression goal used in qualifying compression is selected from a plurality of possible goal values, based on this region identification signal.

As discussed in conjunction with FIG. 16, the region or regions of interest in a video frame can employ lessor compression goals to preserve fidelity compared with portions of the frame outside of the region or regions of interest. In particular, the compression goal is selected to apply a first compression goal to data objects that correspond to the region of interest and a second compression goal to data objects that do not correspond to the region of interest—with the second compression goal requiring more compression in comparison to the first compression goal. For example, the region identification signal can identify one or more regions corresponding to a face in the video frame that may receive greater scrutiny when viewed by a user of the video processing device 125'.

In an embodiment, the compression goal selected for a region of interest could be a trivial goal of 0% compression. This would force the compression/decompression module 252 or 234 to accept any amount of lossless compression—eliminating the possible use of lossy compression in these regions. In other embodiments, a non-trivial but still lessor compression goal could be employed in regions of interest.

This would bias the compression decision toward accepting lossless compression and further toward accepting lessor quantization of the data objects in these regions resulting in fewer losses when lossy compression is employed.

Figure 18:
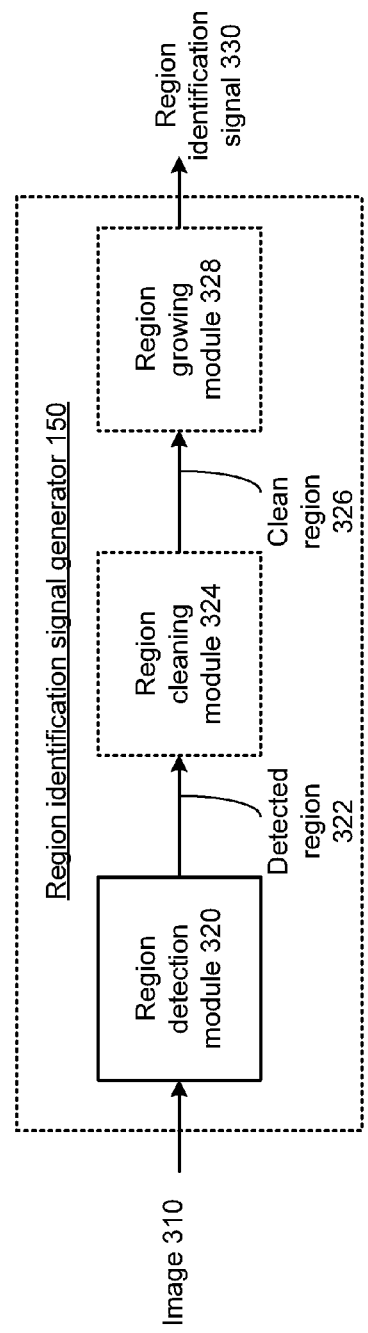
FIG. 18 presents a block diagram representation of a region identification signal generator 150 in accordance with an embodiment of the present invention.

FIG. 18 presents a block diagram representation of a region identification signal generator 150 in accordance with an embodiment of the present invention. In particular, region identification signal generator 150 includes a region detection module 320 for detecting a detected region 322 in the at least one image such as a video frame to be compressed for storage in a compressed video frame buffer 242. In operation, the region detection module 320 can detect the presence of a particular pattern or other region of interest that may require greater image quality. An example of such a pattern is a human face or other face, however, other patterns including symbols, text, important images and as well as application specific patterns and other patterns can likewise be implemented. Region identification signal generator 150 optionally includes a region cleaning module 324 that generates a clean region 326 based on the detected region 322, such via a morphological operation. Region identification signal generator 150 can further include a region growing module that expands the clean region 326 to generate a region identification signal 330 that identifies the region containing the pattern of interest.

Considering, for example, the case where the image 310 includes a human face and the region identification signal generator 150 generates a region corresponding the human face, region detection module 320 can generate detected region 322 based on the detection of pixel color values corresponding to facial features such as skin tones. Region cleaning module can generate a more contiguous region that contains these facial features and region growing module can grow this region to include the surrounding hair and other image portions to ensure that the entire face is included in the region identified by region identification signal 330. The encoding section can operate using region identification signal 330 to emphasize the quality in this facial region while potentially deemphasizing other regions of the image. It should be noted that the overall image may be of higher quality to a viewer given the greater sensitivity and discernment of faces.

Figure 19:
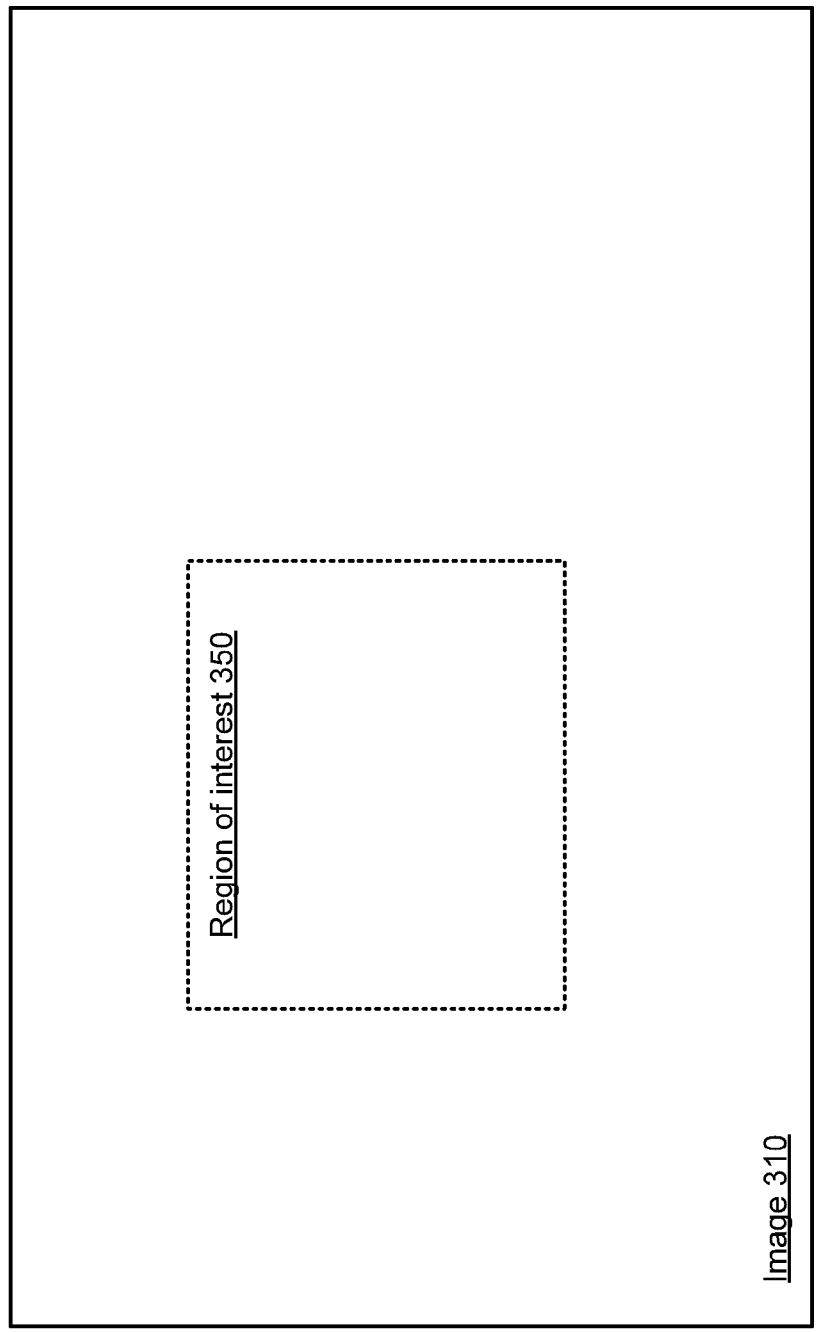
FIG. 19 presents a graphical representation of image 310 in accordance with an embodiment of the present invention.

FIG. 19 presents a graphical representation of image 310 in accordance with an embodiment of the present invention. As shown, a region of interest 350 has been identified by region identification signal generator 150 generating a corresponding region identification signal 330 that indicates either the boundaries of the region of interest 350 or the particular data objects 260 that comprise the region of interest 350.

As discussed in conjunction with FIGS. 16-18, lessor compression goals can be employed when compressing the data objects of the region of interest 350 to preserve fidelity compared with portions of the image 310 outside of the region of interest 350. In particular, the compression goal can be selected to apply a first compression goal to data objects that correspond to the region of interest and a second compression goal to data objects that do not correspond to the region of interest—with the second compression goal requiring more compression in comparison to the first compression goal.

Figure 20:
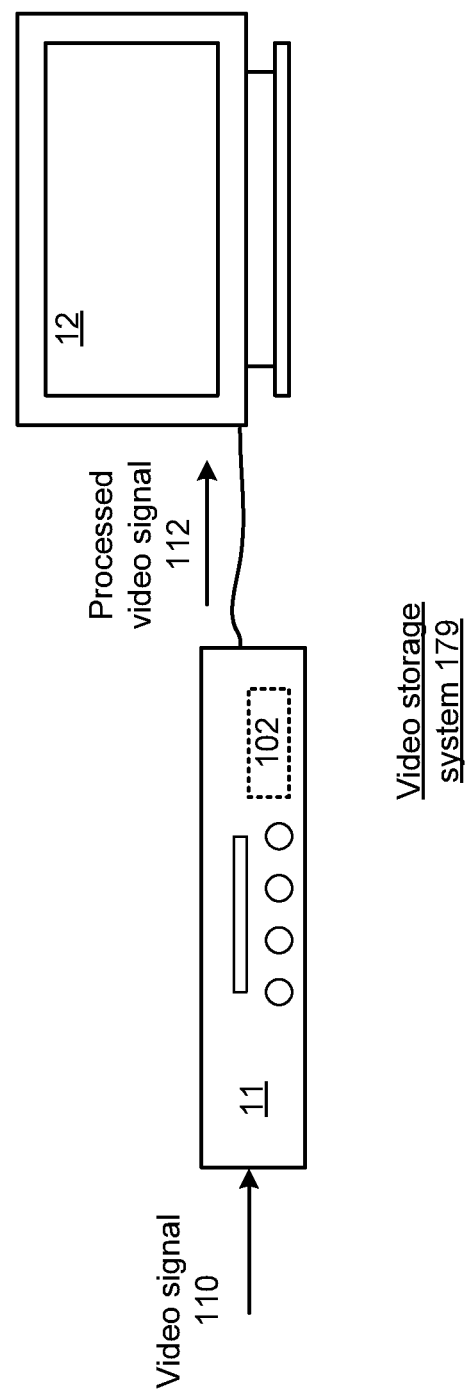
FIG. 20 presents a block diagram representation of a video storage system 179 in accordance with an embodiment of the present invention.

FIG. 20 presents a block diagram representation of a video storage system 179 in accordance with an embodiment of the present invention. In particular, device 11 is a set top box with built-in digital video recorder functionality, a stand alone digital video recorder, a DVD recorder/player or other device that stores a processed video signal 112 for display on video display device such as television 12. While video encoder/decoder 102 is shown as incorporated into device 11 it may be a separate device. In this configuration, video encoder/decoder 102 can further operate to decode the video signal 110 into processed video signal 112 when retrieved from storage to generate a video signal in a format that is suitable for display by video display device 12. While these particular devices are illustrated, video storage system 179 can include a hard drive, flash memory device, computer, DVD burner, or any other device that is capable of generating, storing, decoding and/or displaying the video content of processed video signal 112 in accordance with the methods and systems described in conjunction with the features and functions of the present invention as described herein.

Figure 21:
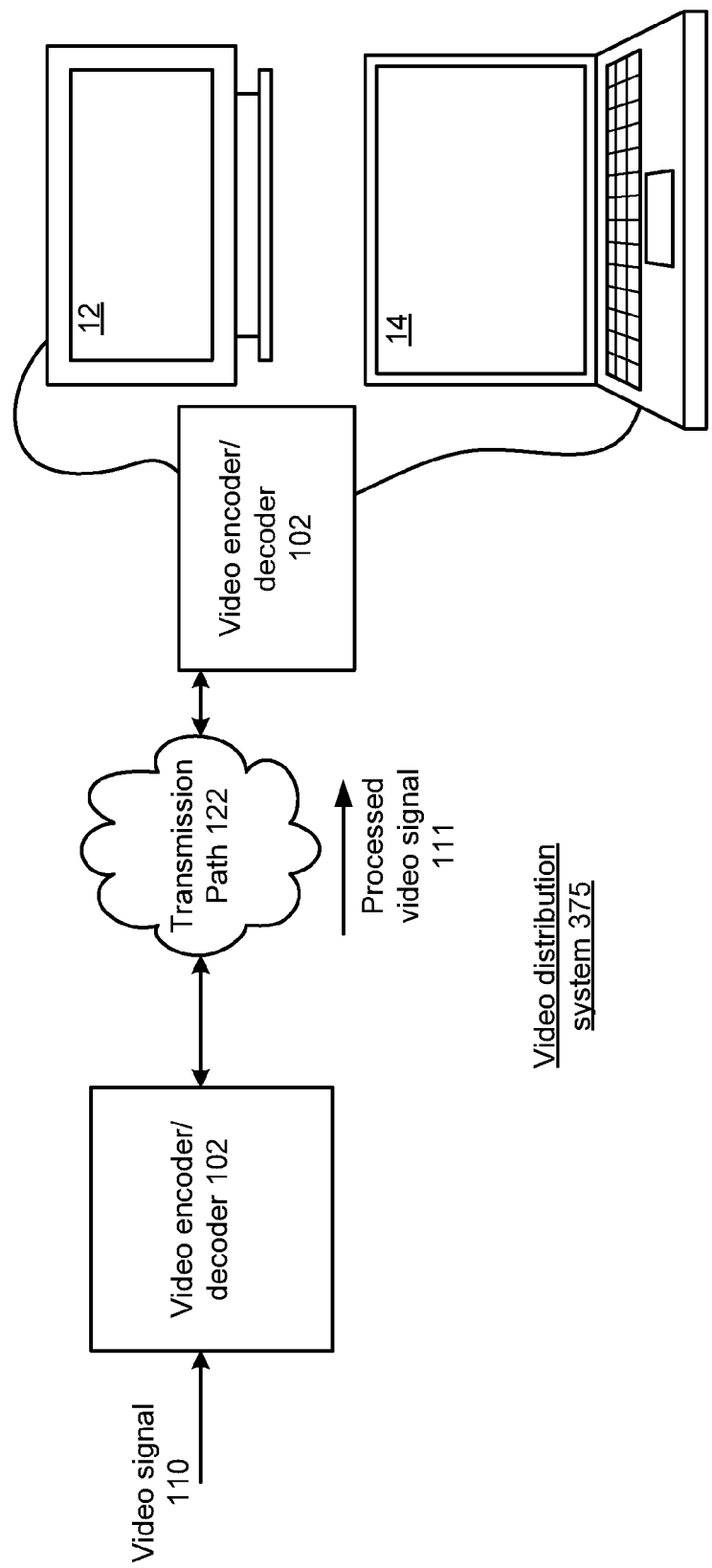
FIG. 21 presents a block diagram representation of a video distribution system 375 in accordance with an embodiment of the present invention.

FIG. 21 presents a block diagram representation of a video distribution system 375 in accordance with an embodiment of the present invention. In particular, a processed video signal 111, created by encoding or transcoding a video signal 110, is transmitted from a first video encoder/decoder 102 via a transmission path 122 to a second video encoder/decoder 102 that operates as a decoder. The second video encoder/decoder 102 operates to decode the processed video signal 111 for display on a display device such as television 10, computer 20 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 22:
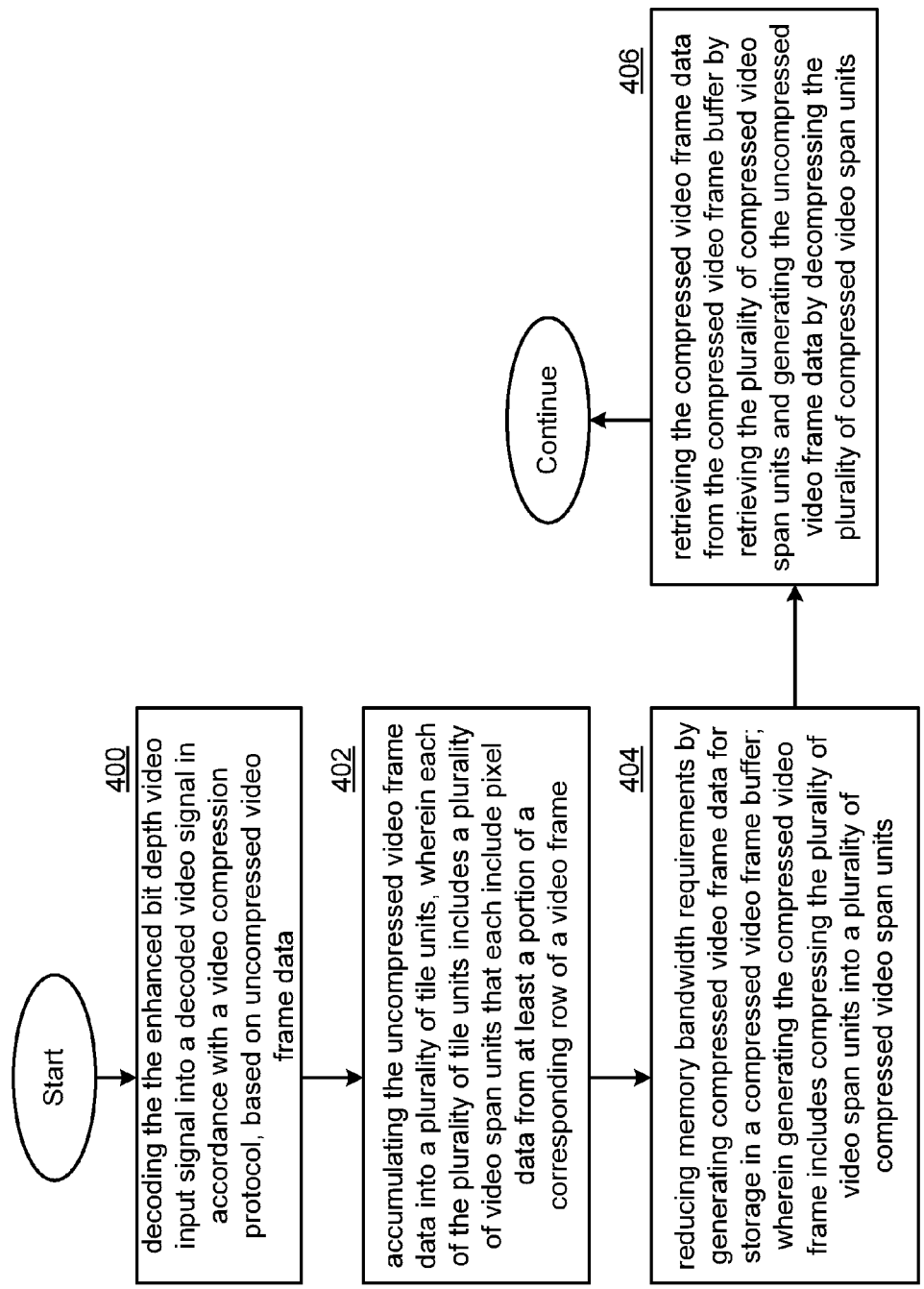
FIG. 22 presents a flowchart representation of a method in accordance with an embodiment of the present invention.

FIG. 22 presents a flowchart representation of a method in accordance with an embodiment of the present invention. In particular, a method is presented for use in conjunction with one or more of the features and functions described in association with FIGS. 1-21. Step 400 includes decoding the enhanced bit depth video input signal into a decoded video signal in accordance with a video compression protocol, based on uncompressed video frame data. Step 402 includes accumulating the uncompressed video frame data into a plurality of tile units, wherein each of the plurality of tile units includes a plurality of video span units that each include pixel data from at least a portion of a corresponding row of a video frame. Step 404 includes reducing memory bandwidth requirements by generating compressed video frame data for storage in a compressed video frame buffer—wherein generating the compressed video frame includes compressing the plurality of video span units into a plurality of compressed video span units. Step 406 includes retrieving the compressed video frame data from the compressed video frame buffer by retrieving the plurality of compressed video span units and generating the uncompressed video frame data by decompressing the plurality of compressed video span units.

Figure 23:
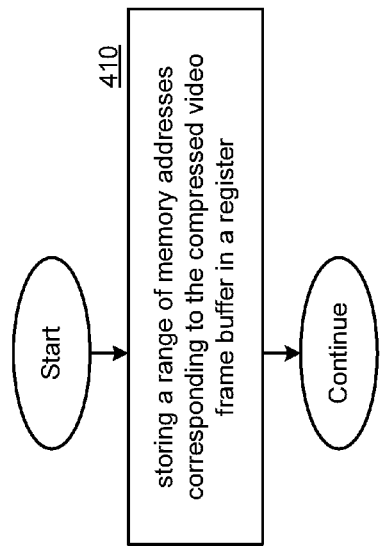
FIG. 23 presents a flowchart representation of a method in accordance with an embodiment of the present invention.

FIG. 23 presents a flowchart representation of a method in accordance with an embodiment of the present invention. In particular, a method is presented for use in conjunction with one or more of the features and functions described in association with FIGS. 1-22. Step 410 includes storing a range of memory addresses corresponding to the compressed video frame buffer in a register.

Figure 24:
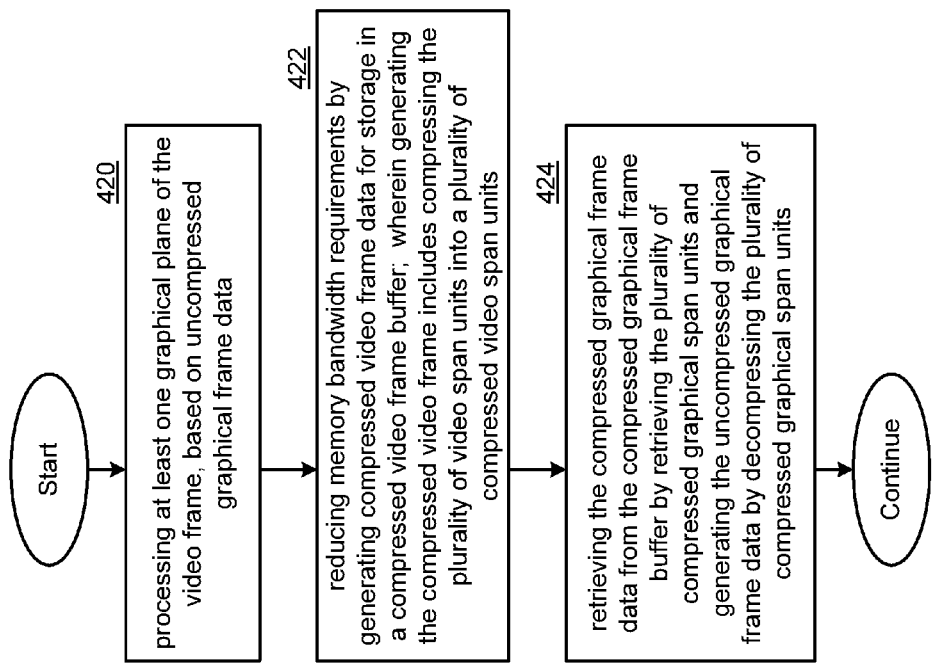
FIG. 24 presents a flowchart representation of a method in accordance with an embodiment of the present invention.

FIG. 24 presents a flowchart representation of a method in accordance with an embodiment of the present invention. In particular, a method is presented for use in conjunction with one or more of the features and functions described in association with FIGS. 1-23. Step 420 includes processing at least one graphical plane of the video frame, based on uncompressed graphical frame data. Step 422 includes reducing memory bandwidth requirements by generating compressed video frame data for storage in a compressed video frame buffer—wherein generating the compressed video frame includes compressing the plurality of video span units into a plurality of compressed video span units. Step 424 includes retrieving the compressed graphical frame data from the compressed graphical frame buffer by retrieving the plurality of compressed graphical span units and generating the uncompressed graphical frame data by decompressing the plurality of compressed graphical span units. The at least one register can define a range of memory addresses corresponding to the compressed graphical frame buffer.

Figure 25:
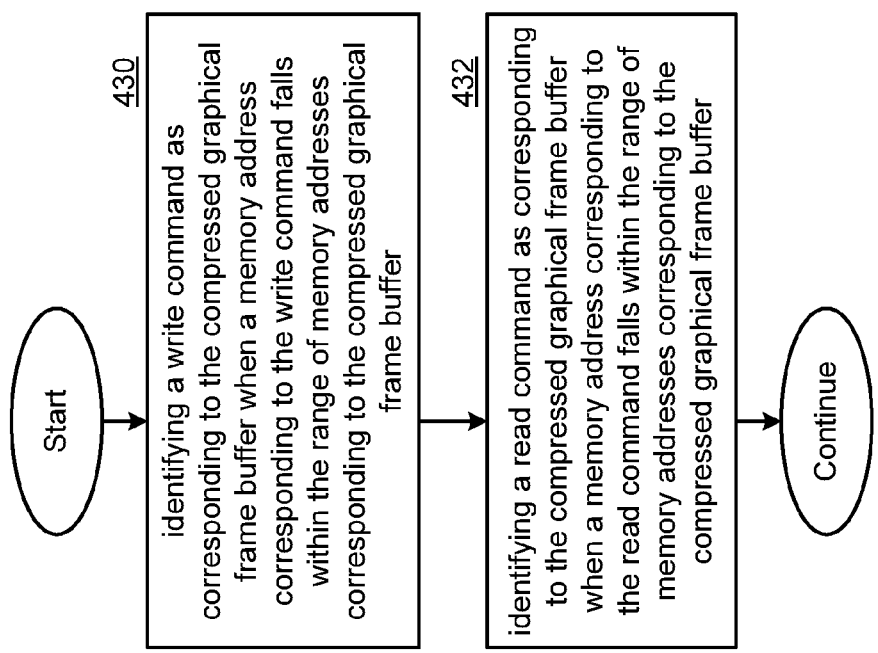
FIG. 25 presents a flowchart representation of a method in accordance with an embodiment of the present invention.

FIG. 25 presents a flowchart representation of a method in accordance with an embodiment of the present invention. In particular, a method is presented for use in conjunction with one or more of the features and functions described in association with FIGS. 1-24. Step 430 includes identifying a write command as corresponding to the compressed graphical frame buffer when a memory address corresponding to the write command falls within the range of memory addresses corresponding to the compressed graphical frame buffer. Step 432 includes identifying a read command as corresponding to the compressed graphical frame buffer when a memory address corresponding to the read command falls within the range of memory addresses corresponding to the compressed graphical frame buffer.

Figure 26:
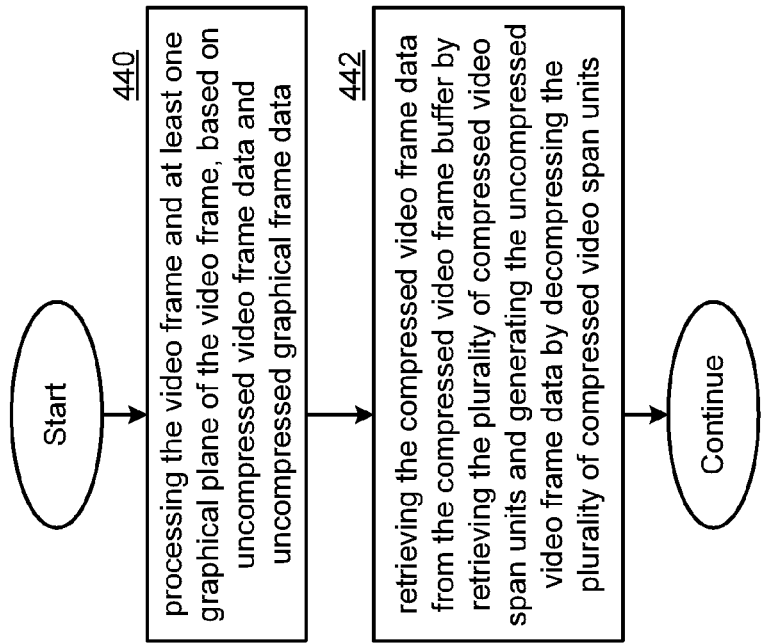
FIG. 26 presents a flowchart representation of a method in accordance with an embodiment of the present invention.

FIG. 26 presents a flowchart representation of a method in accordance with an embodiment of the present invention. In particular, a method is presented for use in conjunction with one or more of the features and functions described in association with FIGS. 1-25. Step 440 includes processing the video frame and at least one graphical plane of the video frame, based on uncompressed video frame data and uncompressed graphical frame data. Step 442 includes retrieving the compressed video frame data from the compressed video frame buffer by retrieving the plurality of compressed video span units and generating the uncompressed video frame data by decompressing the plurality of compressed video span units.

FIG. 27 presents a flowchart representation of a method in accordance with an embodiment of the present invention. In particular, a method is presented for use in conjunction with one or more of the features and functions described in association with FIGS. 1-26. Step 450 includes storing the uncompressed graphical frame data in a cache. Step 452 includes retrieving selected ones of the uncompressed graphical frame data from the cache when the selected ones of the uncompressed graphical frame data are stored in the cache. Step 454 includes retrieving the selected ones of the uncompressed graphical frame data from the compressed graphical frame buffer when the selected ones of the uncompressed graphical frame data are not stored in the cache.

FIG. 28 presents a flowchart representation of a method in accordance with an embodiment of the present invention. In particular, a method is presented for use in conjunction with one or more of the features and functions described in association with FIGS. 1-27. Step 460 includes storing the uncompressed video frame data in a cache. Step 462 includes retrieving selected ones of the uncompressed video frame data from the cache when the selected ones of the uncompressed video frame data are stored in the cache. Step 464 includes retrieving the selected ones of the uncompressed video frame data from the compressed video frame buffer when the selected ones of the uncompressed video frame data are not stored in the cache.

Figure 29:
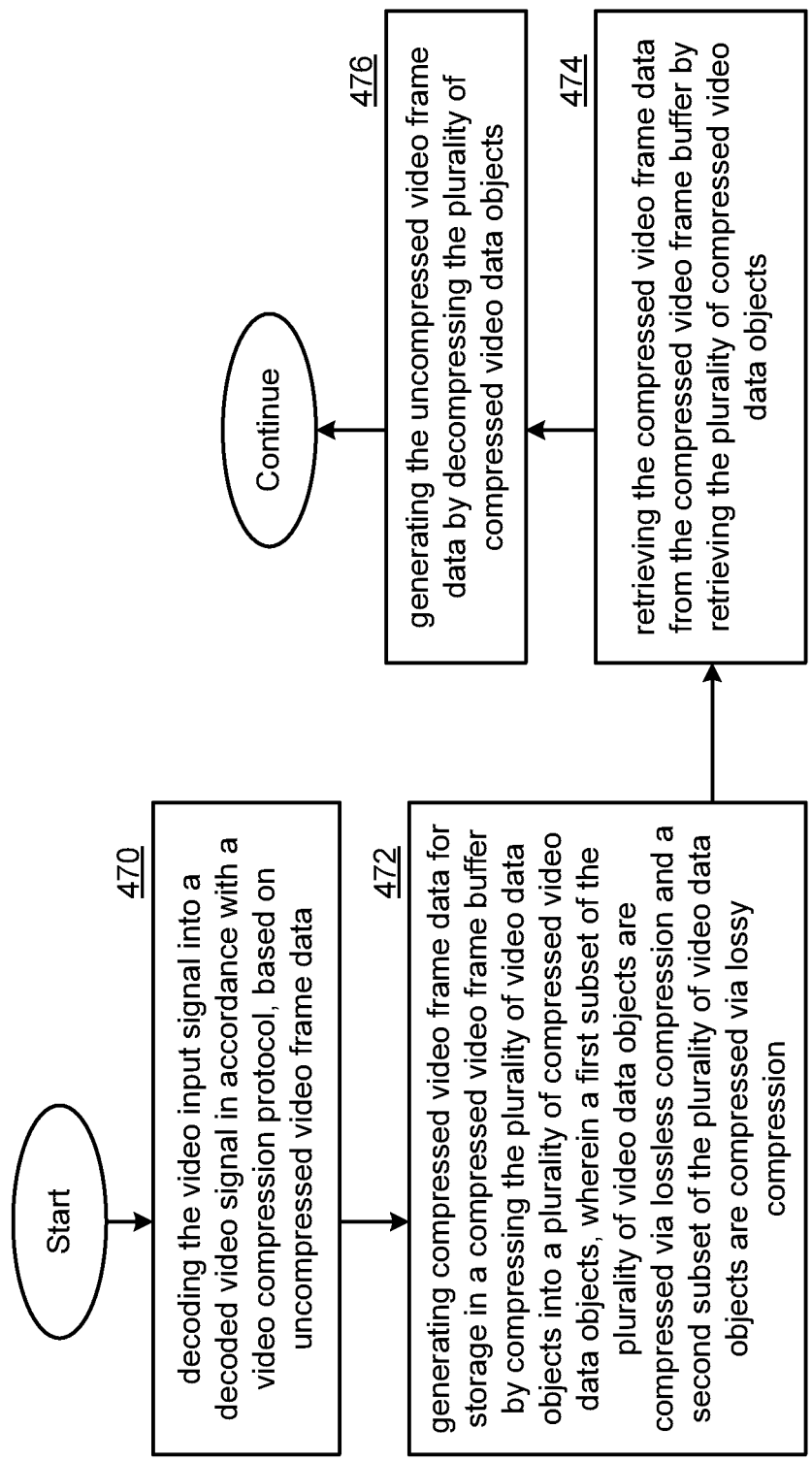
FIG. 29 presents a flowchart representation of a method in accordance with an embodiment of the present invention.

FIG. 29 presents a flowchart representation of a method in accordance with an embodiment of the present invention. In particular, a method is presented for use in conjunction with one or more of the features and functions described in association with FIGS. 1-28. Step 470 includes decoding the video input signal into a decoded video signal in accordance with a video compression protocol, based on uncompressed video frame data. Step 472 includes generating compressed video frame data for storage in a compressed video frame buffer by compressing a plurality of video data objects into a plurality of compressed video data objects, wherein a first subset of the plurality of video data objects are compressed via lossless compression and a second subset of the plurality of video data objects are compressed via lossy compression. Step 474 includes retrieving the compressed video frame data from the compressed video frame buffer by retrieving the plurality of compressed video data objects. Step 476 includes generating the uncompressed video frame data by decompressing the plurality of compressed video data objects.

In an embodiment, the corresponding one of the plurality of video data objects includes pixel data from at least a portion of a corresponding row of a video frame or a plurality of rows of a video frame.

Figure 30:
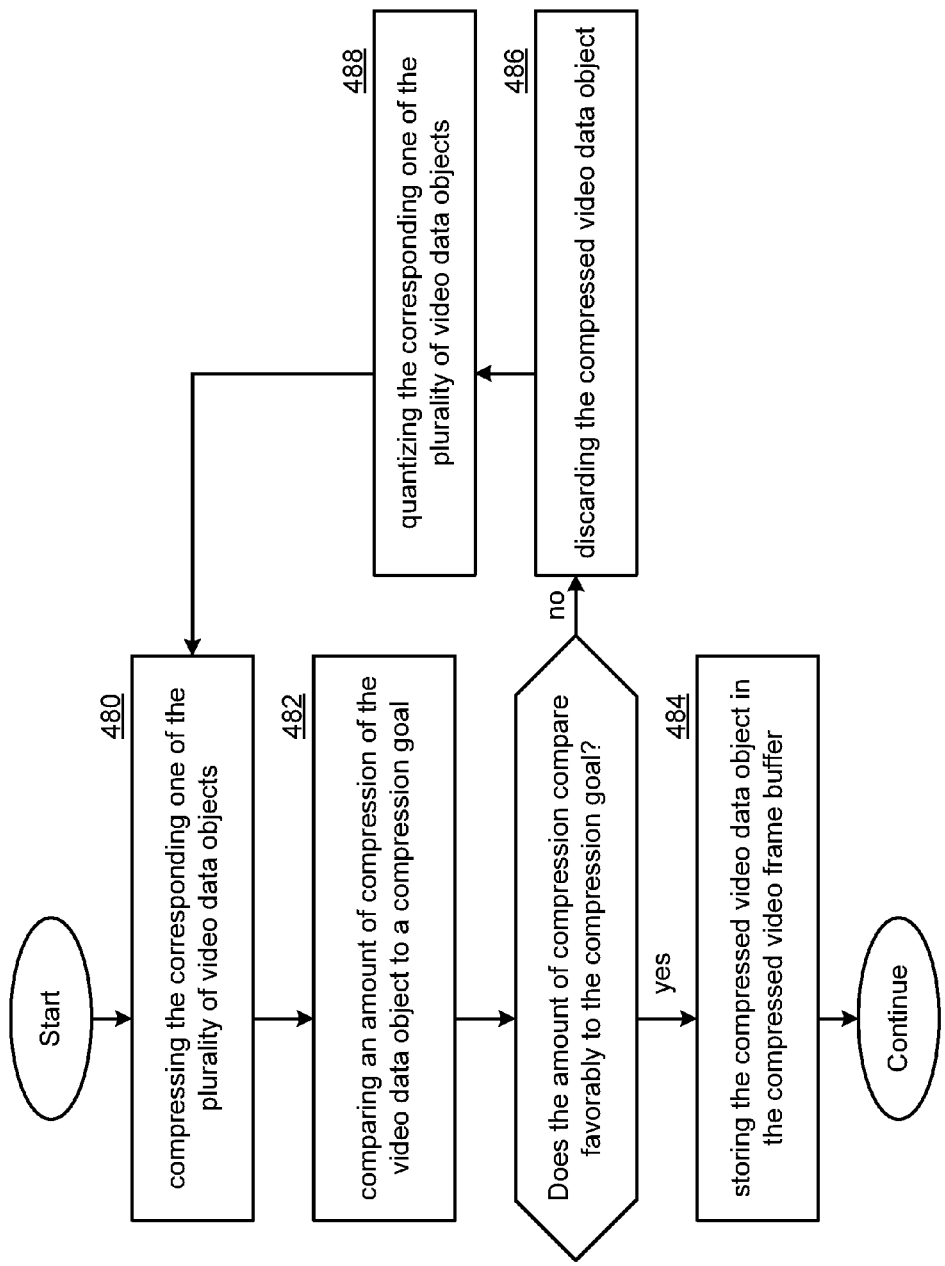
FIG. 30 presents a flowchart representation of a method in accordance with an embodiment of the present invention.

FIG. 30 presents a flowchart representation of a method in accordance with an embodiment of the present invention. In particular, a method is presented for use in conjunction with one or more of the features and functions described in association with FIGS. 1-29. Step 480 includes compressing the corresponding one of the plurality of video data objects. Step 482 includes comparing an amount of compression of the video data object to a compression goal. Step 484 includes storing the compressed video data object in the compressed video frame buffer when the amount of compression of the video data object compares favorably to the compression goal. Step 486 includes discarding the compressed video data object when the amount of compression of the video data object compares unfavorably to the compression goal step 488 includes quantizing the corresponding one of the plurality of video data objects. Steps 480, 482, 486 and 488 are repeated until the amount of compression of the corresponding one of the plurality of video data objects compares favorably to the compression goal and step 484 can be performed. The compression goal can be selected from a plurality of possible goal values, based on a region identification signal that identifies a region within the video frame.

Figure 31:
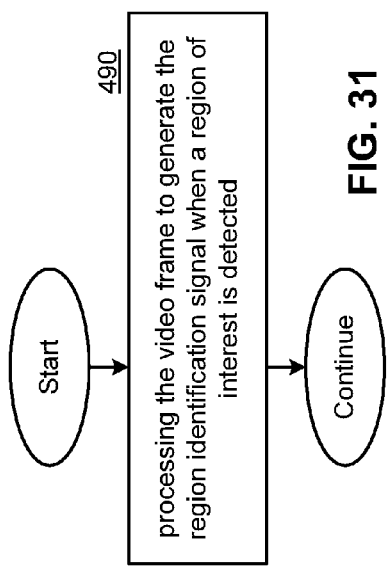
FIG. 31 presents a flowchart representation of a method in accordance with an embodiment of the present invention.

FIG. 31 presents a flowchart representation of a method in accordance with an embodiment of the present invention. In particular, a method is presented for use in conjunction with one or more of the features and functions described in association with FIGS. 1-30. Step 490 includes processing the video frame to generate the region identification signal when a region of interest is detected.

In an embodiment, the compression goal is selected to apply lossless compression to video data objects that correspond to the region of interest. The compression goal can be selected to apply a first compression goal to video data objects that correspond to the region of interest and a second compression goal to video data objects that do not correspond to the region of interest and wherein the second compression goal requires more compression in comparison to the first compression goal.

Figure 32:
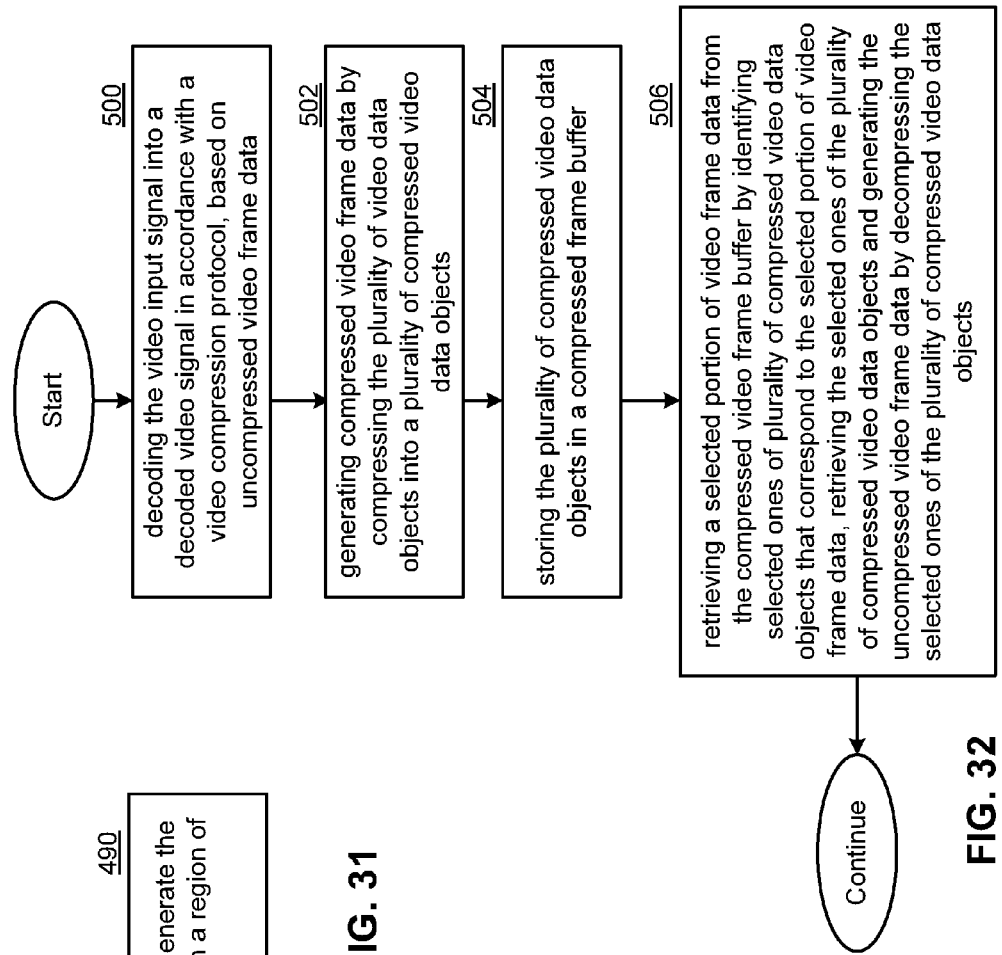
FIG. 32 presents a flowchart representation of a method in accordance with an embodiment of the present invention.

FIG. 32 presents a flowchart representation of a method in accordance with an embodiment of the present invention. In particular, a method is presented for use in conjunction with one or more of the features and functions described in association with FIGS. 1-31. Step 500 includes decoding the video input signal into a decoded video signal in accordance with a video compression protocol, based on uncompressed video frame data. Step 502 includes generating compressed video frame data by compressing a plurality of video data objects into a plurality of compressed video data objects. Step 504 includes storing the plurality of compressed video data objects in a compressed frame buffer. Step 506 includes retrieving a selected portion of video frame data from the compressed video frame buffer by identifying selected ones of plurality of compressed video data objects that correspond to the selected portion of video frame data, retrieving the selected ones of the plurality of compressed video data objects and generating the uncompressed video frame data by decompressing the selected ones of the plurality of compressed video data objects.

In an embodiment, each of the compressed video data objects is stored in the compressed frame buffer at a base memory address at a corresponding predetermined location in a memory. Each of the plurality of video data objects can include pixel data from at least a portion of a corresponding row of a video frame or a plurality of rows of a video frame.

Figure 33:
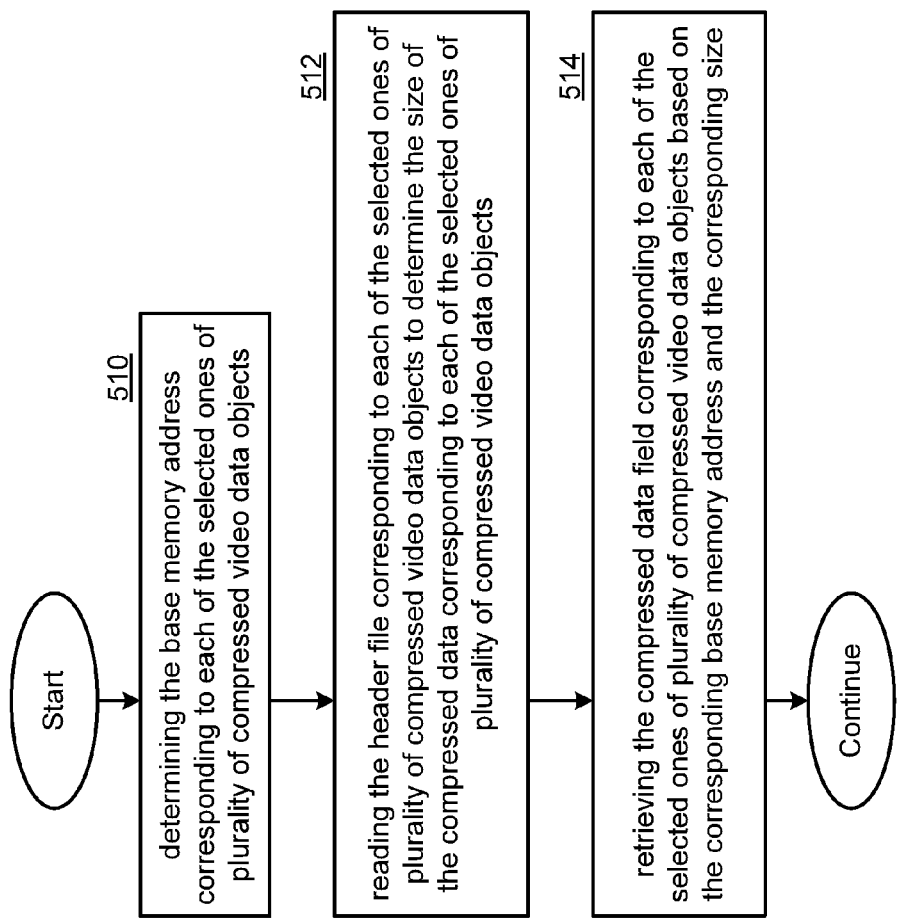
FIG. 33 presents a flowchart representation of a method in accordance with an embodiment of the present invention.

FIG. 33 presents a flowchart representation of a method in accordance with an embodiment of the present invention. In particular, a method is presented for use in conjunction with one or more of the features and functions described in association with FIGS. 1-32. In an embodiment, each of the compressed video data objects includes a header file that indicates a size of the compressed data contained therein and a compressed data field. Step 510 includes determining the base memory address corresponding to each of the selected ones of plurality of compressed video data objects. Step 512 includes reading the header file corresponding to each of the selected ones of plurality of compressed video data objects to determine the size of the compressed data corresponding to each of the selected ones of plurality of compressed video data objects. Step 514 includes retrieving the compressed data field corresponding to each of the selected ones of plurality of compressed video data objects based on the corresponding base memory address and the corresponding size.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "unit", also referred to as a "module", is used in the description of the various embodiments of the present invention. A module includes a processing module, a functional block, hardware, and/or software stored on memory for execution by a processing device that performs one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A video processing device comprising:
   a video processing unit that decodes an enhanced bit depth video input signal into a decoded video signal in accordance with a video compression protocol, based on uncompressed video frame data;
   a tile engine that includes:
      a tile accumulation module that accumulates the uncompressed video frame data into a plurality of tile units, wherein each of the plurality of tile units includes a plurality of video span units that each include pixel data from at least a portion of a corresponding row of a video frame; and
      a tile compression/decompression module, coupled to the tile accumulation module, that reduces memory bandwidth requirements by generating and storing compressed video frame data in a compressed video frame buffer, wherein the tile compression/decompression module is configured to compress the plurality of video span units into a plurality of compressed video span units individually by applying data object compression to the pixel data from the at least the portion of the corresponding row of the video frame, to store the plurality of compressed video span units in the compressed video frame buffer, and further to retrieve the compressed video frame data from the compressed video frame buffer by retrieving the plurality of compressed video span units and generating the uncompressed video frame data by decompressing the plurality of compressed video span units.

2. The video processing device of claim 1 further comprising:
   a span engine, coupled to the tile engine and the compressed video frame buffer, that includes at least one register that defines a range of memory addresses corresponding to the compressed video frame buffer.

3. The video processing device of claim 2 further comprising:
   a graphics processing unit that processes at least one graphical plane of the video frame, based on uncompressed graphical frame data; and
   wherein the span engine further includes a span compression/decompression module that generates compressed graphical frame data for storage in a compressed graphical frame buffer by compressing the uncompressed graphical frame data into a plurality of compressed graphical span units and further that retrieves the compressed graphical frame data from the compressed graphical frame buffer by retrieving the plurality of compressed graphical span units and generating the uncompressed graphical frame data by decompressing the plurality of compressed graphical span units.

4. The video processing device of claim 3 wherein the at least one register defines a range of memory addresses corresponding to the compressed graphical frame buffer.

5. The video processing device of claim 4 wherein the span engine identifies a write command from the graphics processing unit as corresponding to the compressed graphical frame buffer when a memory address corresponding to the write command falls within the range of memory addresses corresponding to the compressed graphical frame buffer; and
   wherein the span engine identifies a read command from the graphics processing unit as corresponding to the compressed graphical frame buffer when a memory address corresponding to the read command falls within the range of memory addresses corresponding to the compressed graphical frame buffer.

6. The video processing device of claim 4 further comprising:
   a display processing unit, coupled to the span engine, that processes the video frame and at least one graphical plane of the video frame, based on the uncompressed video frame data and the uncompressed graphical frame data;
   wherein the span compression/decompression module retrieves the compressed video frame data from the compressed video frame buffer by retrieving the plurality of compressed video span units and generating the uncompressed video frame data by decompressing the plurality of compressed video span units.

7. The video processing device of claim 6 wherein the span engine further includes a cache for storing the uncompressed graphical frame data;
   wherein the span engine responds to requests from the graphics processing unit and the display processing unit by retrieving selected ones of the uncompressed graphical frame data from the cache when the selected ones of the uncompressed graphical frame data are stored in the cache and that further retrieves the selected ones of the uncompressed graphical frame data from the compressed graphical frame buffer when the selected ones of the uncompressed graphical frame data are not stored in the cache.

8. The video processing device of claim 7 wherein the span engine responds to requests from the display processing unit by retrieving selected ones of the uncompressed video frame data from the cache when the selected ones of the uncompressed video frame data are stored in the cache and that further retrieves the selected ones of the uncompressed video frame data from the compressed video frame buffer by retrieving the corresponding one of the plurality of compressed video span units and generating the selected ones of the uncompressed video frame data by decompressing the corresponding one of the plurality of compressed video span units when the selected ones of the uncompressed video frame data are not stored in the cache.

9. The video processing device of claim 1 wherein the compressed video frame buffer stores the compressed video frame data corresponding to an entire frame of the video input signal, and wherein the video processing unit issues a read command to the compressed video frame buffer for at least a portion of a video frame and receives a corresponding portion of the uncompressed video frame data from the compressed video frame buffer in response to the read command.

10. The video processing device of claim 1 wherein the video processing unit transcodes the enhanced bit depth video input signal into a processed video signal by re-encoding the decoded video signal.

11. A method for processing an enhanced bit depth video input signal into a processed video signal, the method comprising:
  decoding the enhanced bit depth video input signal into a decoded video signal in accordance with a video compression protocol, based on uncompressed video frame data;
  accumulating the uncompressed video frame data into a plurality of tile units, wherein each of the plurality of tile units includes a plurality of video span units that each include pixel data from at least a portion of a corresponding row of a video frame;
  reducing memory bandwidth requirements by generating compressed video frame data for storage in a compressed video frame buffer, wherein generating the compressed video frame data includes compressing the plurality of video span units into a plurality of compressed video span units individually by applying data object compression to the pixel data from the at least the portion of the corresponding row of the video frame; and
  retrieving the compressed video frame data from the compressed video frame buffer by retrieving the plurality of compressed video span units and generating the uncompressed video frame data by decompressing the plurality of compressed video span units.

12. The method of claim 11 further comprising:
storing a range of memory addresses corresponding to the compressed video frame buffer in a register.

13. The method of claim 12 further comprising:
processing at least one graphical plane of the video frame, based on uncompressed graphical frame data;
generating compressed graphical frame data for storage in a compressed graphical frame buffer by compressing the uncompressed graphical frame data into a plurality of compressed graphical span units; and
retrieving the compressed graphical frame data from the compressed graphical frame buffer by retrieving the plurality of compressed graphical span units and generating the uncompressed graphical frame data by decompressing the plurality of compressed graphical span units.

14. The method of claim 13 wherein the register defines a range of memory addresses corresponding to the compressed graphical frame buffer.

15. The method of claim 14 further comprising;
identifying a write command as corresponding to the compressed graphical frame buffer when a memory address corresponding to the write command falls within the range of memory addresses corresponding to the compressed graphical frame buffer; and
identifying a read command as corresponding to the compressed graphical frame buffer when a memory address corresponding to the read command falls within the range of memory addresses corresponding to the compressed graphical frame buffer.

16. The method of claim 14 further comprising:
processing the video frame and at least one graphical plane of the video frame, based on the uncompressed video frame data and the uncompressed graphical frame data; and
retrieving the compressed video frame data from the compressed video frame buffer by retrieving the plurality of compressed video span units and generating the uncompressed video frame data by decompressing the plurality of compressed video span units.

17. The method of claim 16 further comprising:
storing the uncompressed graphical frame data in a cache;
retrieving selected ones of the uncompressed graphical frame data from the cache when the selected ones of the uncompressed graphical frame data are stored in the cache; and
retrieving the selected ones of the uncompressed graphical frame data from the compressed graphical frame buffer when the selected ones of the uncompressed graphical frame data are not stored in the cache.

18. The method of claim 16 further comprising:
storing the uncompressed video frame data in a cache;
retrieving selected ones of the uncompressed video frame data from the cache when the selected ones of the uncompressed video frame data are stored in the cache; and
retrieving the selected ones of the uncompressed video frame data from the compressed video frame buffer when the selected ones of the uncompressed video frame data are not stored in the cache.

* * * * *